United States Patent
Coulombe et al.

(10) Patent No.: US 12,053,848 B1
(45) Date of Patent: Aug. 6, 2024

(54) REPAIR METHODS FOR COMPONENTS HAVING A DAMAGED PORTION ON A SURFACE THEREOF

(71) Applicant: PRATT & WHITNEY CANADA CORP., Longueuil (CA)

(72) Inventors: Josianne Coulombe, Boucherville (CA); Thomas Georges, Longueuil (CA); Addison Rayner, Halifax (CA); Jessie Gagnon, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/144,026

(22) Filed: May 5, 2023

(51) Int. Cl.
  *B23P 6/00* (2006.01)
  *B23P 6/04* (2006.01)
  *F01D 5/00* (2006.01)

(52) U.S. Cl.
  CPC ............ *B23P 6/007* (2013.01); *B23P 6/045* (2013.01); *F01D 5/005* (2013.01); *F05D 2230/80* (2013.01)

(58) Field of Classification Search
  CPC .. B23P 6/007; B23P 6/04; B23P 6/002; B23P 6/045
  See application file for complete search history.

(56) References Cited

U.S. PATENT DOCUMENTS

| | | | |
|---|---|---|---|
| 4,726,101 A * | 2/1988 | Draghi | B22F 7/062 29/402.09 |
| 5,040,718 A | 8/1991 | Lee et al. | |
| 5,156,321 A | 10/1992 | Liburdi et al. | |
| 5,822,852 A * | 10/1998 | Bewlay | B23P 6/005 29/402.13 |
| 6,223,976 B1 * | 5/2001 | Clement | B23K 1/19 228/262.72 |
| 6,391,252 B1 | 5/2002 | David et al. | |
| 6,837,417 B2 | 1/2005 | Srinivasan | |
| 7,653,994 B2 | 2/2010 | Dasilva et al. | |
| 8,087,565 B2 | 1/2012 | Kottilingam et al. | |
| 8,356,409 B2 * | 1/2013 | Perret | F01D 5/005 29/402.09 |
| 10,265,792 B2 | 4/2019 | Cui et al. | |
| 10,279,438 B2 | 5/2019 | Ozbaysal et al. | |
| 10,392,938 B1 | 8/2019 | Ghunakikar et al. | |
| 11,311,935 B2 | 4/2022 | Sheng et al. | |
| 11,559,847 B2 | 1/2023 | Cui et al. | |
| 2007/0107216 A1 * | 5/2007 | DaSilva | B23P 6/005 29/889.1 |
| 2023/0093658 A1 | 3/2023 | Kush et al. | |

* cited by examiner

*Primary Examiner* — Sarang Afzali
(74) *Attorney, Agent, or Firm* — NORTON ROSE FULBRIGHT CANADA LLP

(57) ABSTRACT

A repair method for a component having a damaged portion on a surface thereof includes obtaining a feedstock mixture comprising base material particles and a binder, forming a preform with the feedstock mixture, placing the preform on the damaged portion of the surface of the component, and subjecting the component and the preform to at least one thermal cycle for forming a metallurgical bond in a solid state between the preform and the surface of the component after the at least one thermal cycle, the at least one thermal cycle occurring below a melting temperature of the component and the preform. A repair method involving pouring fluid feedstock mixture on a damaged portion of the surface of the component is also disclosed.

5 Claims, 8 Drawing Sheets

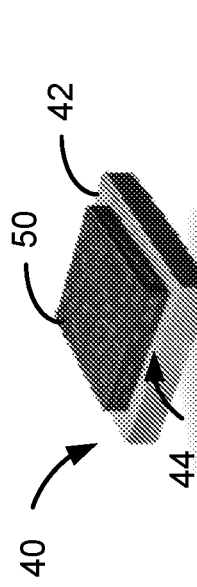
FIG. 2A
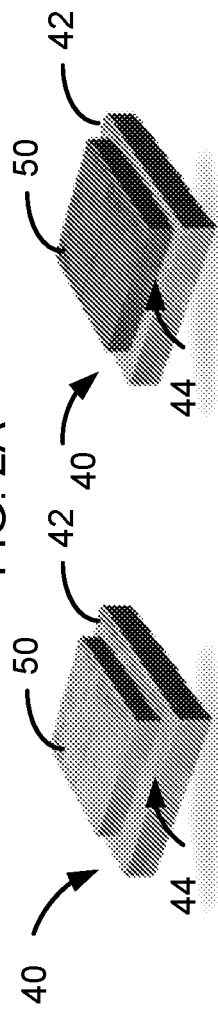
FIG. 2B
FIG. 2C
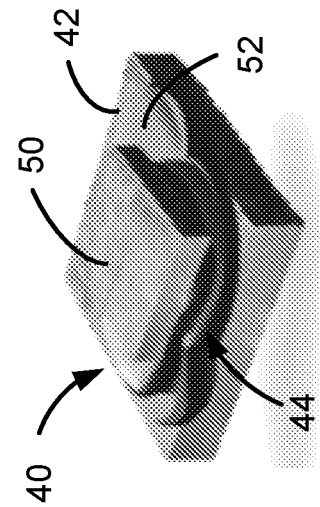
FIG. 2E
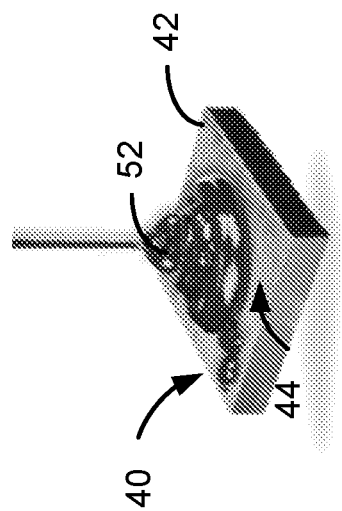
FIG. 2D

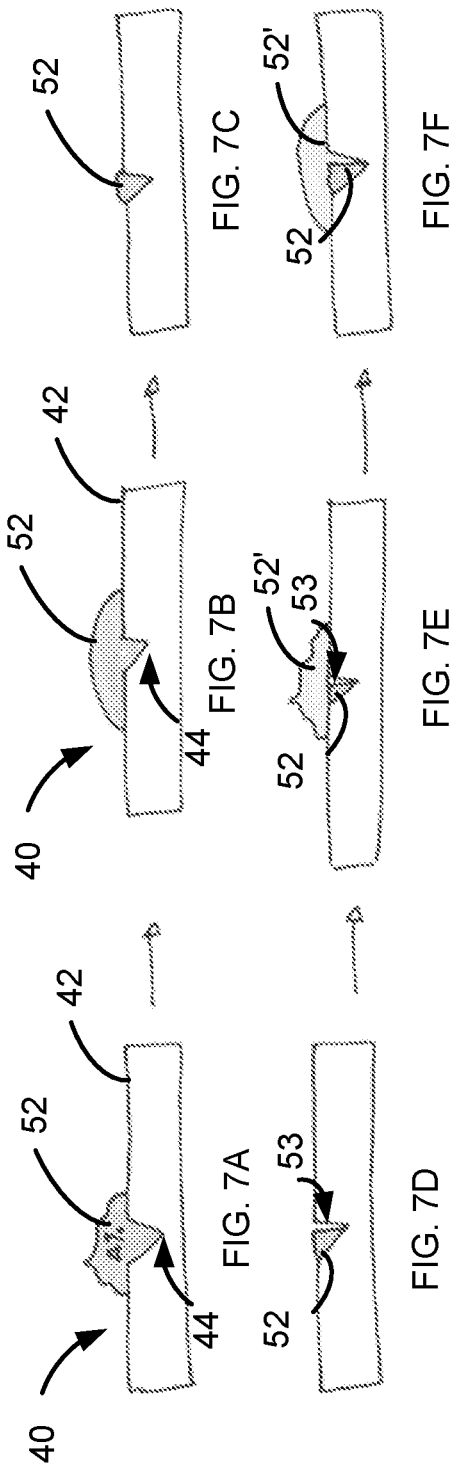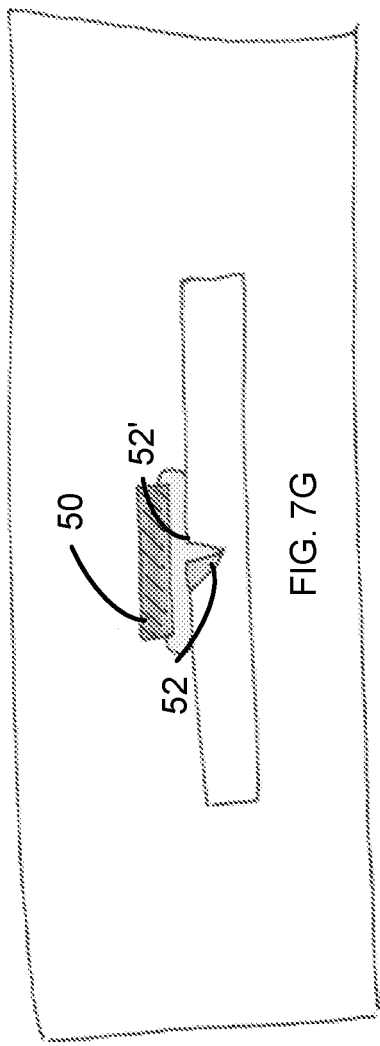

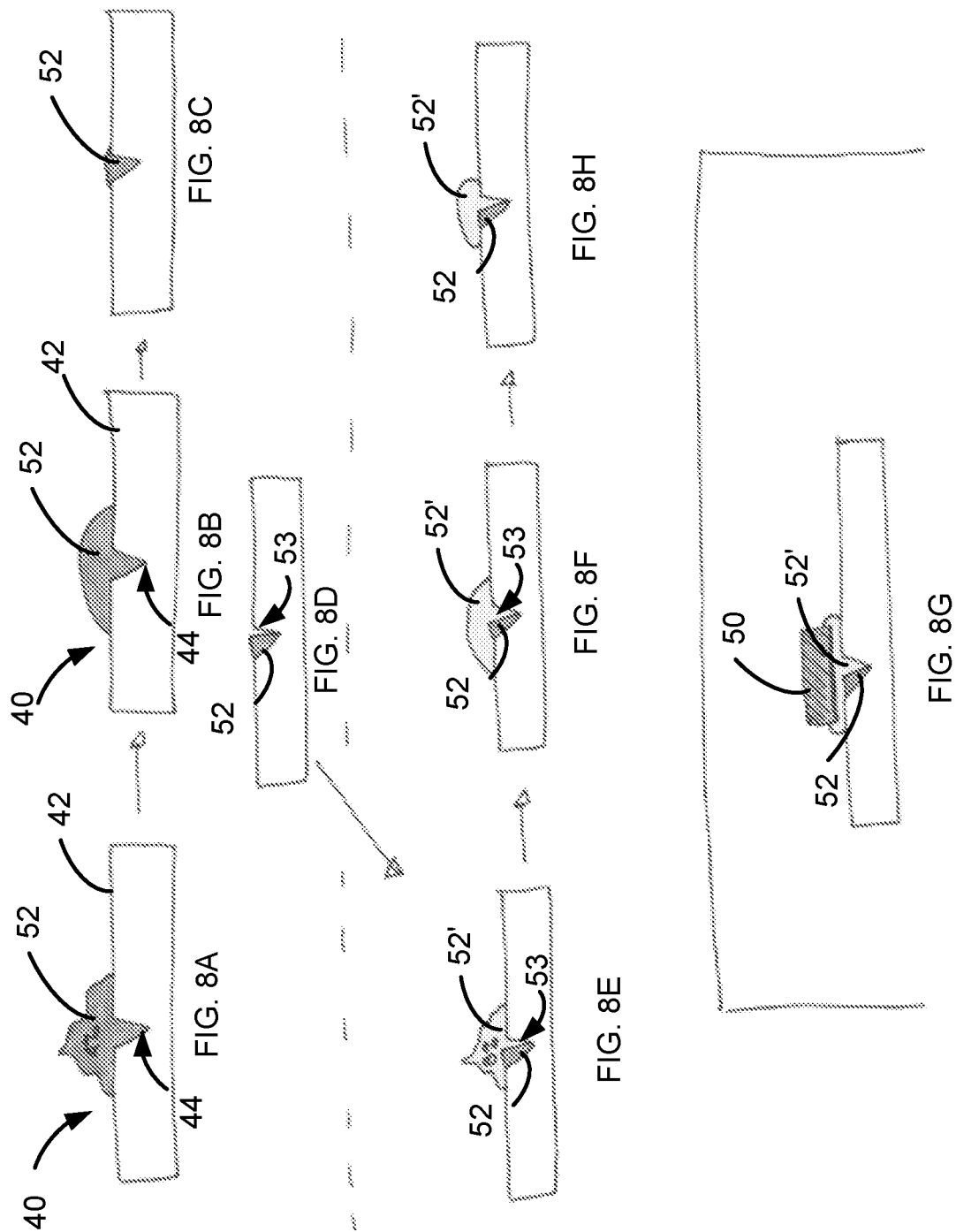

REPAIR METHODS FOR COMPONENTS HAVING A DAMAGED PORTION ON A SURFACE THEREOF

TECHNICAL FIELD

The present disclosure relates generally to repair methods for components having a damaged portion on a surface thereof, and more particularly to repair method for high temperature components of gas turbine engines having a damaged portion on a surface thereof.

BACKGROUND OF THE ART

High temperature components in gas turbine engines may be damaged, and need to be repaired to increase their life cycle.

Conventional repair methods involve brazing techniques and brazing material that may not withstand the operating conditions of the component, not form a microstructural bond with the base material, and/or introduce undesirable phases such as silicides and borides in the base material.

Therefore, improvements are needed.

SUMMARY

In accordance with a broad aspect, there is provided a repair method for a component having a damaged portion on a surface thereof, the method including obtaining a feedstock mixture including base material particles and a binder, forming a preform with the feedstock mixture, placing the preform on the damaged portion of the surface of the component, and subjecting the component and the preform to at least one thermal cycle for forming a metallurgical bond in a solid state between the preform and the surface of the component after the at least one thermal cycle, the at least one thermal cycle occurring below a melting temperature of the component and the preform.

The method may include any of the following features, in any combinations.

In some implementations, the feedstock mixture consists of base material particles and binder.

In some implementations, the feedstock mixture further includes particles of a melting point depressant material, and the feedstock mixture consists of the base material particles, the binder and the melting point depressant material.

In some implementations, the feedstock mixture includes up to 3%-wt of the melting point depressant material.

In some implementations, the component is made of a casting of a nickel-based superalloy, or of a casting of a cobalt-based superalloy.

In some implementations, the base material particles are made of an alloy selected from the group consisting of Mar-M247, B1900Hf, IN792 and IN713.

In some implementations, the obtaining of the feedstock mixture includes applying a vacuum, mixing and heating the feedstock mixture above a melting point of the binder.

In some implementations, the repair method further includes at least one of thermal debinding and sintering of the preform prior to the placing of the preform on the damaged portion of the surface of the component.

In some implementations, the forming of the preform includes injection molding of the feedstock mixture.

In some implementations, the repair method further includes, prior to the placing of the preform on the damaged portion of surface of the component, at least one of stripping and cleaning the damaged portion of the surface of the component.

In some implementations, the repair method further includes at least one of polishing the component to smooth the damaged portion of the surface of the component, and polishing the preform.

In some implementations, the repair method further includes forming a recess in the surface of the component, and machining the preform to fit within the recess.

In some implementations, the forming of the preform includes shaping the preform to a near net shape.

In some implementations, the repair method further includes shaping the preform to a net shape.

In some implementations, the repair method further includes applying a heat treatment cycle to the component and the preform after the formation of the metallurgical bond therebetween.

In accordance with another broad aspect, there is provided a repair method for a component having a damaged portion on a surface thereof, the method including obtaining a feedstock mixture including base material particles and a binder, heating and homogenizing the feedstock mixture to obtain a fluid feedstock mixture, pouring the fluid feedstock mixture on the damaged portion of the surface of the component, solidifying the fluid feedstock mixture to obtain a solidified feedstock mixture on the damaged portion of the surface of the component, and subjecting the component and the solidified feedstock mixture to at least one thermal cycle for forming a metallurgical bond in a solid state between the solidified feedstock mixture and the surface of the component after the at least one thermal cycle, the at least one thermal cycle occurring below a melting temperature of the component and the solidified feedstock mixture.

The method may include any of the following features, in any combinations.

In some implementations, the repair method further includes heating the component to a pre-determined temperature prior to the pouring of the fluid feedstock mixture on the damaged portion of the surface of the component.

In some implementations, the repair method further includes debinding the solidified feedstock mixture prior to the subjecting to the at least one thermal cycle.

In some implementations, the repair method further includes forming a preform by injecting the feedstock mixture into a mold, debinding and sintering the preform, placing the debound and sintered preform on the poured feedstock mixture prior to the solidification of the fluid feedstock mixture, and subjecting the component, the preform and the solidified feedstock mixture to the at least one thermal cycle.

In some implementations, the feedstock mixture is a first feedstock mixture consisting of the base material particles, the binder and of a first ratio of melting point depressant material, and the repair method further includes obtaining a second feedstock mixture consisting of the base material particles, the binder and of a second ratio of melting point depressant material, the second ratio different from the first ratio, pouring the second feedstock mixture on the damaged portion of the surface of the component including the first solidified feedstock mixture, solidifying the second feedstock mixture to obtain a second solidified feedstock mixture on the damaged portion of the surface of the component, and subjecting the component and the first and second solidified feedstock mixtures to at least one thermal cycle for forming a metallurgical bond in a solid state between the first and second solidified feedstock mixtures and the surface of the component after the at least one thermal cycle.

BRIEF DESCRIPTION OF THE DRAWINGS

Reference is now made to the accompanying figures in which:

FIG. 2A is a perspective view of a portion of a component having a damaged portion on a surface thereof, with a preform as a green part covering the damaged portion;

FIG. 2B is a perspective view of the portion of the component of FIG. 2A, with a preform as a brown part covering the damaged portion;

FIG. 2C is a perspective view of the portion of the component of FIG. 2A, with a preform as a sintered part covering the damaged portion;

FIG. 2D is a perspective view of the portion of the component of FIG. 2A, with fluid feedstock mixture poured on the damaged portion;

FIG. 2E is a perspective view of the portion of the component of FIG. 2A, with solidified feedstock mixture and a sintered preform on the damaged portion;

FIG. 7A is a schematic view of a component having a fluid feedstock mixture poured on a damaged portion;

FIG. 7B is a schematic view of the component of FIG. 7A, with the feedstock mixture let still to wet the damaged portion;

FIG. 7C is a schematic view of the component of FIG. 7B, with excess material from the feedstock mixture removed;

FIG. 7D is a schematic view of the component of FIG. 7C, with the feedstock mixture solidified, creating a gap;

FIG. 7E is a schematic view of the component of FIG. 7D, with a second fluid feedstock mixture poured on the solidified feedstock mixture and the damaged portion;

FIG. 7F is a schematic view of the component of FIG. 7E, with the second feedstock mixture filling the gap;

FIG. 7G is a schematic view of the component of FIG. 7F, with a debound and sintered preform placed on the poured second feedstock mixture;

FIG. 7H is a schematic view of the component of FIG. 7F, with excess material from the second feedstock mixture removed;

FIG. 8A is a schematic view of a component having a fluid feedstock mixture poured on a damaged portion;

FIG. 8B is a schematic view of the component of FIG. 8A, with the feedstock mixture let still to wet the damaged portion;

FIG. 8C is a schematic view of the component of FIG. 8B, with excess material from the feedstock mixture removed;

FIG. 8D is a schematic view of the component of FIG. 8C, with the feedstock mixture solidified;

FIG. 8E is a schematic view of the component of FIG. 8D, with a second fluid feedstock mixture poured on the solidified feedstock mixture and the damaged portion;

FIG. 8F is a schematic view of the component of FIG. 8E, with the second feedstock mixture let still to wet the damaged portion;

FIG. 8G is a schematic view of the component of FIG. 8F, with a debound and sintered preform placed on the poured second feedstock mixture; and FIG. 8H is a schematic view of the component of FIG. 8F, with excess material from the second feedstock mixture removed.

It will be noted that throughout the appended drawings, like features are identified by like reference numerals.

DETAILED DESCRIPTION

Figure 1:
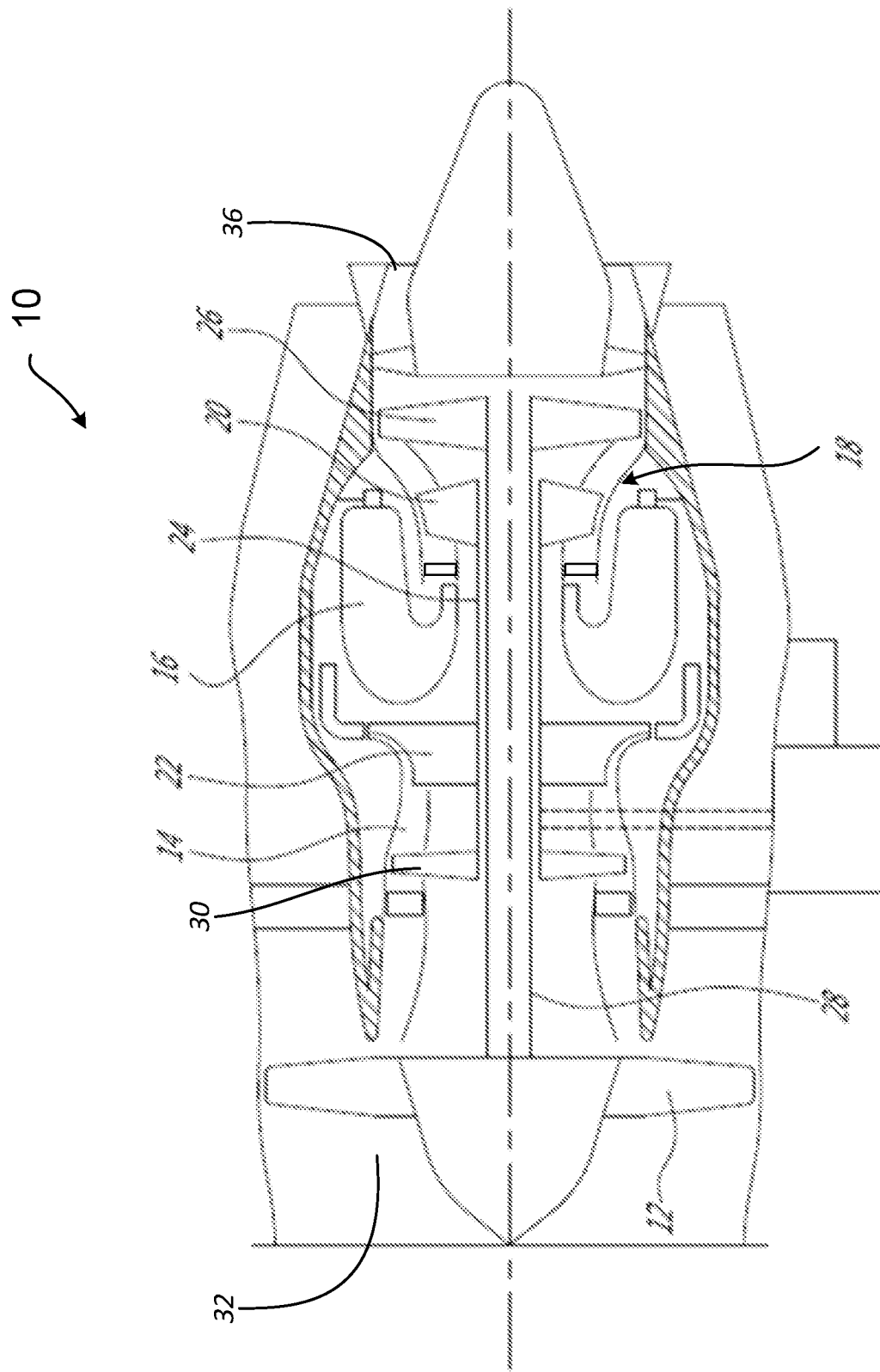
FIG. 1 is a schematic cross-sectional view of an example gas turbine engine.

There are described herein repair methods for components of a gas turbine engine. FIG. 1 illustrates an example implementation of a gas turbine engine 10 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotors 22 and 32 of the compressor section 14 through a high pressure shaft 24. Low pressure rotors 26 of the turbine section 18 are drivingly engaged to the fan rotor 12 and to low pressure rotors 30 of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section. A turboprop engine or turbojet may also apply. In addition, although the engine 10 is described herein for flight applications, it should be understood that other uses, such as industrial or the like, may apply.

The repair methods 100, 200, 300 about to be described are particularly suitable for components found in hot sections of the gas turbine engine 10, such as the turbine vane segments, vane rings, vane shrouds and other static components found in the turbine section 18. As used herein, the term "hot gas path component" shall refer collectively to stationary vanes or blades and rotating blades of the turbine section 18, unless otherwise stated. The hot gas path components may be made of a casting of a superalloy material, such as a nickel-based superalloy or cobalt-based superalloy. Superalloy examples may include, but are not limited to, Rene 108, CM 247LC, Waspaloy, CMSX single crystal alloys, Mar-M246™, Mar-M247™, B1900Hf, IN 713, IN 738, and IN 939. Superalloys may provide a wide variety of physical properties, such as, but not limited to, high mechanical strength, high thermal creep deformation resistance, high corrosion or oxidation resistance, and good surface stability. However, superalloy materials do no lend themselves to conventional repair techniques such as welding. More particularly, with superalloy materials, conventional welding is insufficient because the weld does not result in a structure that has the same properties as the ones of the component. In addition, the welding may cause additional damages to the component, such as cracking.

During operation of the gas turbine engine 10, hot gas path components are subjected to high stress and high temperature conditions, and various types of damage or deterioration can occur. For example, wear tends to develop on the surface of hot gas path components as a result of rubbing contact between adjacent component(s). Cracks may appear as the result of high mechanical and thermal stresses due to high operating conditions. Degradation may occur as a result from oxidation or hot corrosion. Because the cost of components made of superalloys is relatively high, it is typically more desirable to repair these components than to replace them. For the same reason, new-make components that require repair due to manufacturing flaws are also preferably repaired instead of being scrapped. The repair methods 100, 200, 300 about to be described are intended to increase the service life of a component, such as a hot gas path component, and are contemplated to enable use of the component for at least one additional life cycle.

Before describing the repair methods 100, 200, 300 and with reference to FIGS. 2A to 2E, there is shown a portion of a component 40 having a surface 42 including a damaged portion 44. The damaged portion 44 can include a crack, a hole, fretting, corrosion defect, a buildup, etc. As such, different types of defects are contemplated. In some implementations, the component 40 is a hot gas path gas turbine engine component, such as a turbine blade, a vane or the like. The surface 42 can be an internal or external surface of the component 40. With additional reference to FIGS. 3, 4 and 6, the repair methods 100, 300 involve the use of a preform 50 that is made of a feedstock mixture 52 including base material particles 54 and binder 56. The base material particles 54 have a composition similar to that of the component 40, and in some implementations a composition similar to that of the surface 42 of the component 40. In some implementations, the binder 56 includes a mixture of polymeric compounds that are wax-based or polyethylene glycol-based. The binder 56 enables the feedstock mixture 52 to flow during casting or injection molding. When the feedstock mixture 52 is used in injection molding, the binder 56 holds the base material particles 54 together in the desired shape in the form of the preform 50. The repair method 200 (FIG. 5) does not involve the use of the preform 50 but rather involves pouring fluid feedstock mixture 52 on the damaged portion 44 of the surface 42 of the component 40, as depicted in FIG. 2D. The repair method 300 involves the use of fluid feedstock mixture 52 and a preform 50, as depicted in FIG. 2E.

Figure 3:
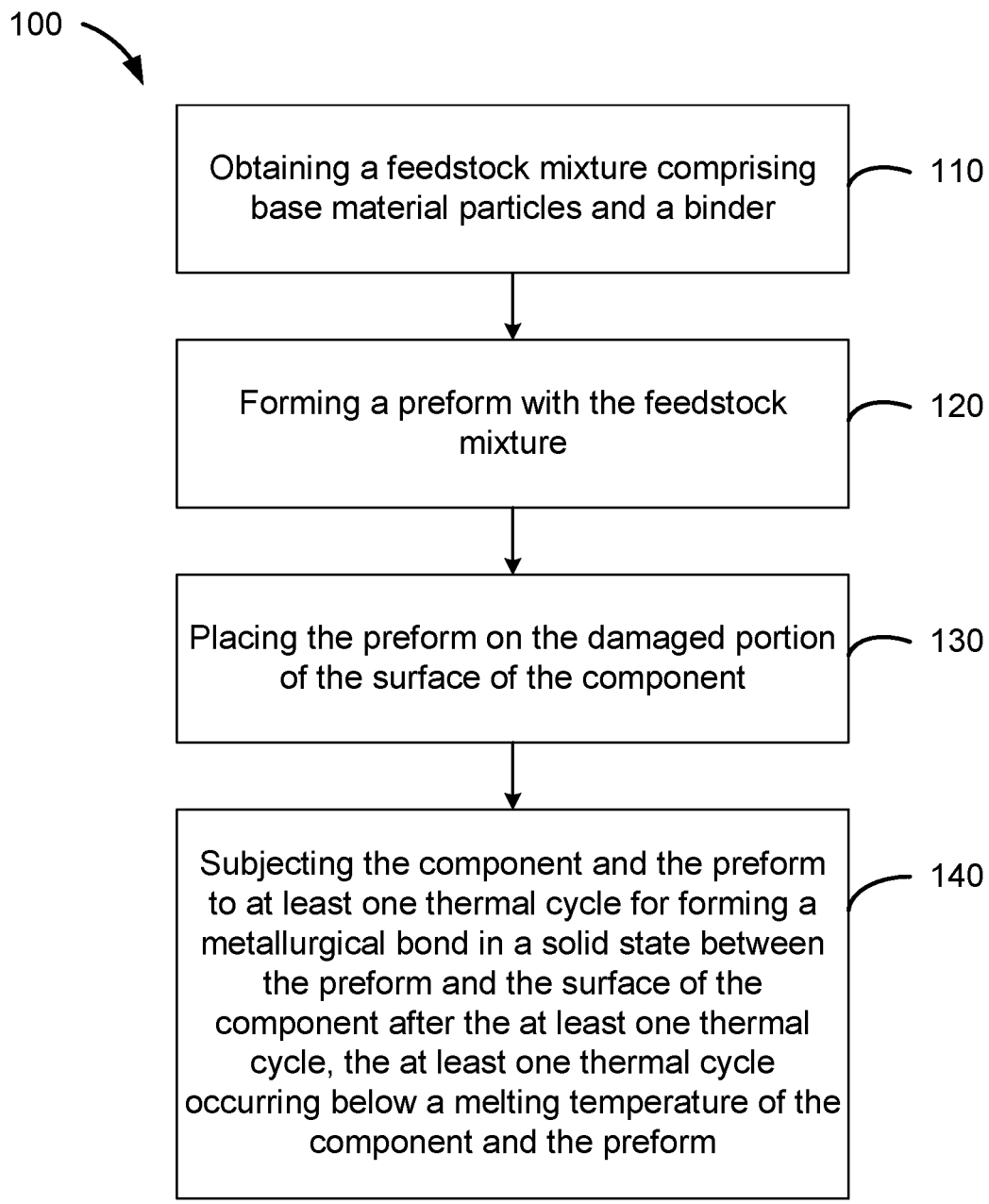
FIG. 3 is a flowchart of a repair method for a component having a damaged portion on a surface thereof.

Referring now to FIG. 3, there is generally described the repair method 100 for the component 40. The repair method 100 involves at step 110 obtaining a feedstock mixture 52 including the base material particles 54 and the binder 56. At step 120, the repair method 100 includes forming a preform 50 with feedstock mixture 52. At step 130, the preform 50 is placed on the damaged portion 44 of the surface 42 of the component 40. At step 140, the method 100 includes subjecting the component 40 and the preform 50 to at least one thermal cycle for forming a metallurgical bond in a solid state between the preform 50 and the surface 42 of the component 40 after the at least one thermal cycle is complete, the at least one thermal cycle occurring below a melting temperature of the component 40 and the preform 50.

Each one of the steps of the repair method 100 will now be described in more detail with reference to FIG. 4. At step 110, the feedstock mixture 52 is obtained. The feedstock mixture 52 can include the base material particles 54 and the binder 56 as described above. The base material particles 54 is generally of a size below 60 µm, and in some implementations below 25 µm, to promote rapid sintering of the base material particles 54 and minimize porosity in the preform 50. Other particle sizes are contemplated.

In some implementations, the feedstock mixture 52 consists of the base material particles 54 and the binder 56. Put differently, in some variants, the feedstock mixture 52 is free from an additional material that could have a melting point lower than that of the base material particles 54. In some implementations, the feedstock mixture 52 is free from a melting point depressant (MPD) material. In the repair methods 100, 200, 300, even if MPD is present in the feedstock mixture 52, there is no fusion involved during the repair process, which can limit or avoid the formation of borides, silicides and eutectic phases in the component 40, the preform 50 and/or at an interface therebetween.

In some implementations, the feedstock mixture 52 further includes a melting point depressant material 58. In some implementations, the feedstock mixture 52 consists of the base material particles 54, the binder 56 and the melting point depressant 58 particles. The melting point depressant 58 is an alloying material that decreases the melting temperature of an alloy. In some implementations, the melting point depressant 58 promotes sintering of the base material particles 54 and enables metallurgical continuity of the preform 50 with the component 40 at temperature below the melting point of the base material particles 54 and/or of the component 40. In an implementation, the melting point depressant 58 is a nickel-based alloy containing silicon and boron, such as BNi-2. Other melting point depressant 58 are contemplated, including and not limited to BNi-5, BNi-9, DF4B, Nicrobraz 150 or high melt/low melt mixtures. In an implementation, the feedstock mixture 52 has up to 3%-wt of the melting point depressant material 58. Having the melting point depressant 58 in the feedstock mixture 52 forming the preform 50 creates, under some conditions, a metallic cohesion between the preform 50 and the component 40, and with a melting temperature close to the base material particles 54. In addition, since the ratio of melting point depressant material 58 is relatively low (for example up to 3%-wt), the amount of brittle microstructures due to the presence of borides and silicides in the repaired area, i.e. in the component 40, the preform 50 and/or at an interface therebetween, is very low.

During preparation of the feedstock mixture 52, vacuum and heat are applied at 112. The feedstock mixture 52 is heated above a melting point of the binder 56 and mixed to homogenize. Herein, the feedstock mixture 52 having the binder 56 liquefied and being is ready for forming the preform 50 is referred to as the fluid feedstock mixture 52. It is noted that the temperature reached by the feedstock mixture 52, the fluid feedstock mixture 52 and the preform 50 is below the melting point of the base material particles 54. Again, the repair methods 100, 200, 300 do not involve fusion of the base material particles 54 and/or of the material making the component 40.

At step 120, the preform 50 is formed with the fluid feedstock mixture 52 using injection molding techniques, in some implementations. More particularly, the preform 50 is formed with the fluid feedstock mixture 52 using metal injection molding techniques. In one implementation, the injection temperature is below 100° C. and the injection pressure ranges between 20 to 50 PSI (about 1.36 atm to about 3.40 atm). Other injection temperatures and pressures are contemplated. The preform 50 can be of any suitable shape. For instance, the preform 50 can have a shape selected for improving contact with the surface 42 and/or to cover entirely the damaged portion 44. The preform 50 has no limitations as to the size, shape, or orientation of the damaged portion 44 to be filled and/or covered by the preform 50. For instance, the preform 50 can be shaped to a fit a pre-machined damage, to fill a V-out, to build up a flange or a surface, or to replace an edge of the component

40. In a variant, the preform 50 is formed by injecting the fluid feedstock mixture 52 in a net shape mold (i.e. exactly the desired shape with all the details) or in a near net shape mold (i.e. roughly the desired shape without the details). Hence, the preform 50 can be shaped at 122*a* as a near net shape preform, or a net shape preform at 122*b*. In a variant where the preform 50 is in a near net shape, the preform 50 is machined to the desired net shape at step 122*c*. The step 122*c* is referred to herein as "green machining" of the preform 50 as the preform 50 is still considered as a green part at this stage, i.e. where the preform 50 is made of solidified binder 56 and base material particles 54. The preform 50 being a green part is depicted in FIG. 2A.

In some implementations, the preform 50 is then subjected to thermal debinding at step 124. More particularly, the preform 50 is heated to a temperature sufficient to thermally decompose a majority of the binder 56 present in the preform 50. In a variant, the preform 50 is placed in a crucible, surrounded with alumina powder, the alumina powder is compacted with pressure and vibration, and then the crucible containing the alumina powder and the preform 50 is heated for binder removal. After the debinding step 124, the preform 50 is considered a brown part, i.e. a non-densified polymer-free powder metallurgy part, and is depicted in FIG. 2B.

In some implementations, the preform 50 is then subjected to sintering at step 126. The sintering step 126 involves heating the preform 50 to a sintering temperature that is below the melting point of the base material particles 54, which results in metallurgical bonding of the base material particles 54 through cohesion and densification. After the sintering step 126, the preform 50 is then considered a sintered part and is depicted in FIG. 2C. In some implementations, the repair method 100 further includes post-sintering steps 126*a*, such as hot isostatic pressing and/or heat treatment for decreasing porosity and obtaining desired mechanical properties, for example.

The repair method 100 further includes surface preparation steps 128 in some implementations. The surface preparation steps 128 about to be described may be performed alone or in combination, depending on the repair needed. Surface preparation steps 128 may include stripping of the component 40 at step 128*a*. The stripping 128*a* involves removing a surface portion of the surface 42 of the component 40 to expose a subsurface of the component 40. The surface preparation steps 128 may also include cleaning the surface 42 of the component 40 at step 128*b*. The cleaning step 128*b* may include fluoride ions cleaning techniques where hydrogen fluoride (HF) gas attack deeply embedded oxides found on the surface 42 and/or in the damaged portion 44 to remove oxides therefrom. Other suitable cleaning techniques are contemplated. At step 128*c*, a recess is formed in the surface 42 of the component 40, and the preform 50 is initially formed in an oversize condition relative to the recess to allow for machining the preform 50 to a size and shape that closely fits within and/or completely fills the recess. The size and shape of the preform 50 is selected to achieve a proper joint gap that will be filled after the thermal cycle of step 140. The condition of the preform 50, i.e. whether the preform 50 is a green part, a brown part or a sintered part, is also to be taken into account when machining the preform 50 to fit within the recess. At step 128*d* the contact surface of the preform 50 (i.e. the surface of the preform 50 intended to contact the surface 42 of the component 40) is polished to smooth the contact surface. At step 128*e*, the surface 42 of the component 40 including the damaged portion 44 is polished. The polishing steps 128*d*, 128*e* assist in improving the contact surface area between the preform 50 and the component 40.

Figure 4:
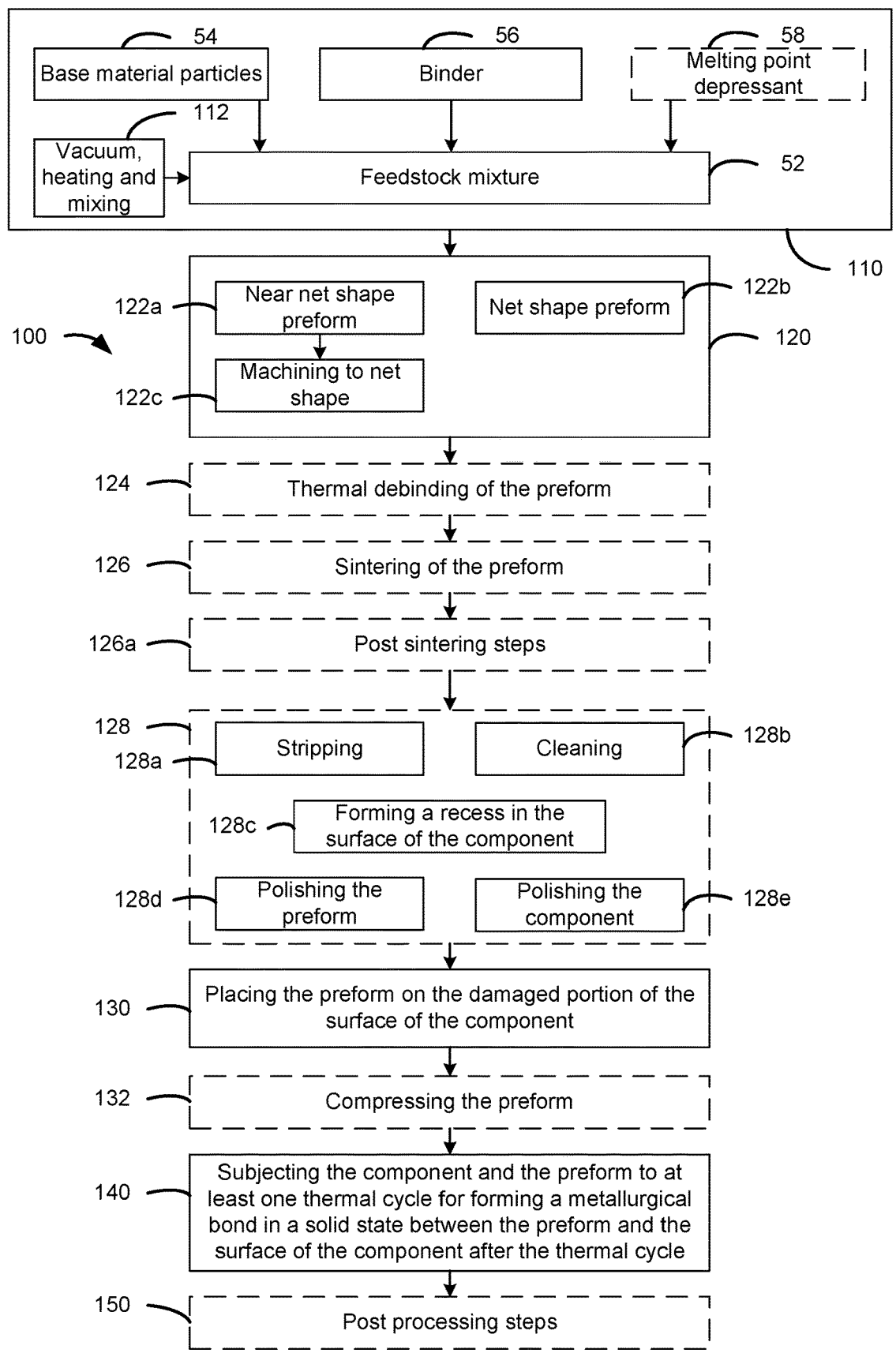
FIG. 4 is a flowchart of the repair method of FIG. 3, with additional steps.

Still referring to FIG. 4, the preform 50 is placed on the damaged portion 44 of the surface 42 of the component 40 at step 130. The preform 50 is thus placed on the damaged portion 44 to cover entirely the damaged portion 44, or to be received within a recess formed in the surface 42, as described with reference to step 128*c*, depending on the situation. In some implementations, at step 132, the preform 50 is compressed against the damaged portion 44 of the surface 42 to improve contact therebetween. The compression can be made manually, using small weights, using clamps or hydrostatic pressure applied to the preform 50 and the component 40, and for a pre-determined amount of time.

At step 140, the component 40 and the preform 50 are subjected to a thermal cycle for forming a metallurgical bond in a solid state between the preform 50 and the surface 42 of the component 40 after the thermal cycle. The thermal cycle occurs in or just below a sintering temperature range, which is below the melting point of the base material particles 54, and which results in metallurgical bonding of the base material particles 54, cohesion and densification. The metallurgical bonding means that there is metallurgical continuity between the material forming the component 40 and the material forming the preform 50. The sintering yields to a sintered preform 50 with good mechanical strength and low porosity. Suitable temperatures for the thermal cycle depends on the particular composition of the base material particles 54 and the melting point depressant 58 (if present), and the composition of the feedstock mixture 52. The preform 50 is thus bound to the component 40 in a solid state by sintering, and not by brazing nor diffusion bonding. Put differently, there is no fusion of the base material particles 54, the component 40 or of the melting point depressant 58 (if present) occurring during the thermal cycle of step 140. In implementations where the preform 50 has not yet been debound when placed on the component 40 (i.e. the preform 50 is still a green part), different thermal cycles may occur. For example, the step 124 of thermal debinding of the preform 50 is first performed and then the thermal cycle of step 140 causes sintering of the preform 50 and bonds the preform 50 to the component 40. In implementations where the preform 50 is debound but has not yet been sintered when placed on the component 40 (i.e. the preform 50 is still a brown part), other thermal cycle(s) may apply. For example, the thermal cycle of step 140 causes sintering of the preform 50 and bonds the preform 50 to the component 40. In some implementations, the steps 124, 126 and/or 140 are performed within a non-oxidizing atmosphere (i.e. vacuum, inert gas or inert gas partial pressure).

At step 150, the component 40 and the bonded preform 50 are subjected to post-processing steps including, and not limited to, machining of the preform 50 to remove excess material, mechanical and/or chemical cleaning, hot isostatic pressing, heat treatment, coating, etc. The heat treatment(s) can cause, in some implementations, precipitate-hardening within the sintered preform 50 and the component 40.

Figure 5:
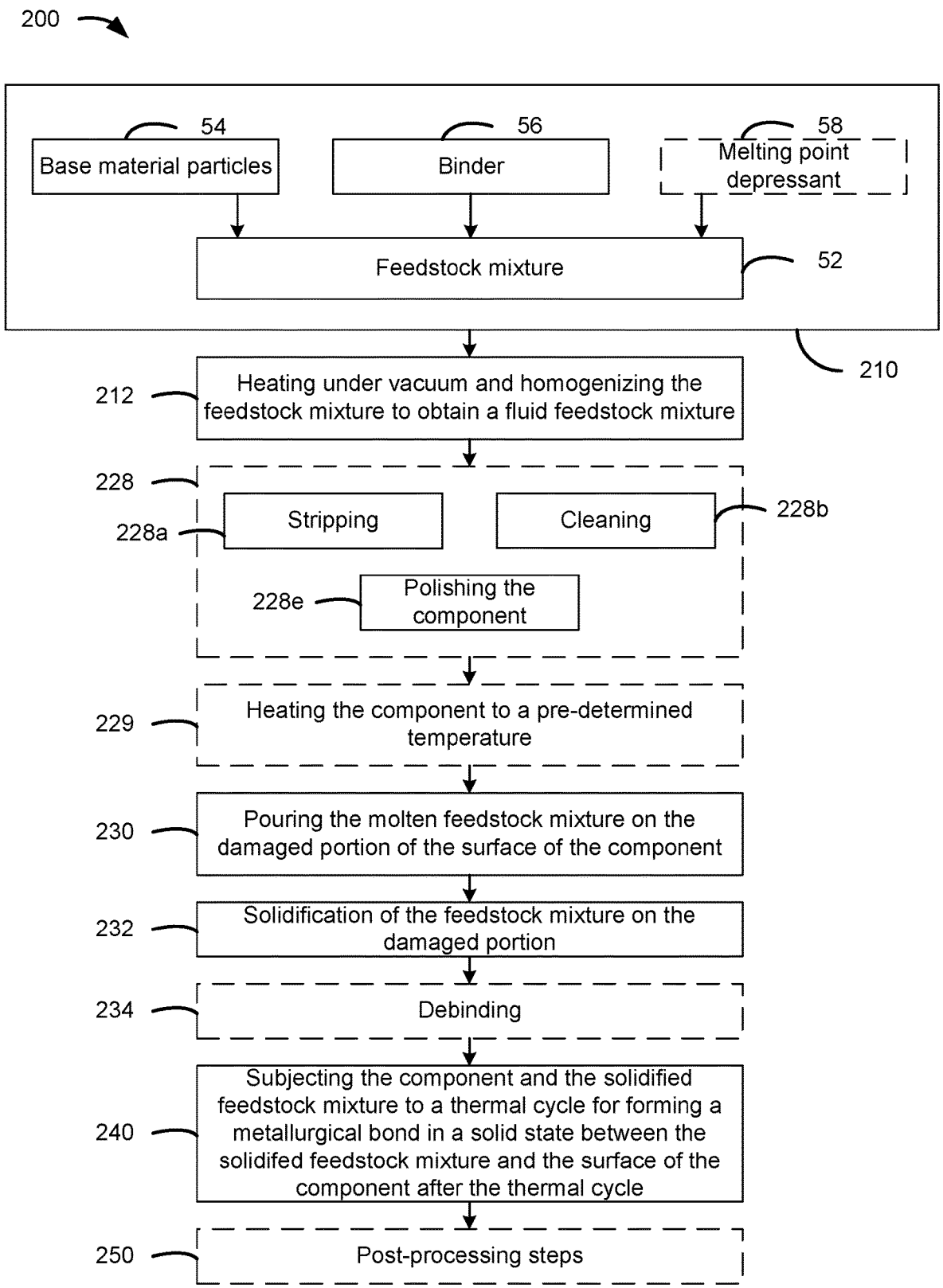
FIG. 5 is a flowchart of another repair method for a component having a damaged portion on a surface thereof.

Referring to FIG. 5, the repair method 200 will be described in detail. The repair method 200 involves steps similar to that of the repair method 100, and such steps will be referred to using similar reference numerals, but in the 200 series, unless stated otherwise.

At step 210, the feedstock mixture 52 is obtained. As described above, in some implementations, the feedstock mixture 52 consists of the base material particles 54 and the binder 56. In some implementations, the feedstock mixture 52 further includes the melting point depressant material 58, and may consists of the base material particles 54, the binder 56 and the melting point depressant material 58.

At step 212, the feedstock mixture 52 is heated under vacuum and mixed to homogenize, yielding to a fluid feedstock mixture 52 where the binder 56 is liquefied and where the base material particles 54 are still solid.

In some implementations, one or more surface preparation steps occur at step 228. The component 40 may be subjected to stripping at 228a, cleaning at 228b, and polishing at 228e.

At step 229, the component 40 is heated to a pre-determined temperature. The heating of the component 40 may slow down the solidification of the fluid feedstock mixture 52 about to be poured on the damaged portion 44 of the surface 42 of the component 40.

At step 230, the fluid feedstock mixture 52 is poured on the damaged portion 44 of the surface 42 of the component 40, sinks in the damaged portion 44 and wets the damaged portion 44 of the surface 42. Solidification of the fluid feedstock mixture 52 occurs on the damaged portion 44 of the surface 42 at step 232. At 234, the component 40 and the solidified feedstock mixture 52 are heated to thermally decompose the binder 56.

At step 240, the component 40 and the solidified feedstock mixture 52 are subjected to a thermal cycle for forming a metallurgical bond in a solid state between the solidified feedstock mixture 52 and the surface 42 of the component 40 after the thermal cycle. As described above, the thermal cycle occurs in a sintering temperature range, which is below the melting point of the base material particles 54, and which results in metallurgical bonding of the base material particles 54, cohesion and densification.

At step 250, the component 40 and the bonded feedstock mixture 52 are subjected to post-processing steps including, and not limited to, machining to remove excess material, mechanical and/or chemical cleaning, hot isostatic pressing, heat treatment, coating, etc. The heat treatment(s) can cause, in some implementations, precipitate-hardening within the feedstock mixture 52 and the component 40.

Figure 6:
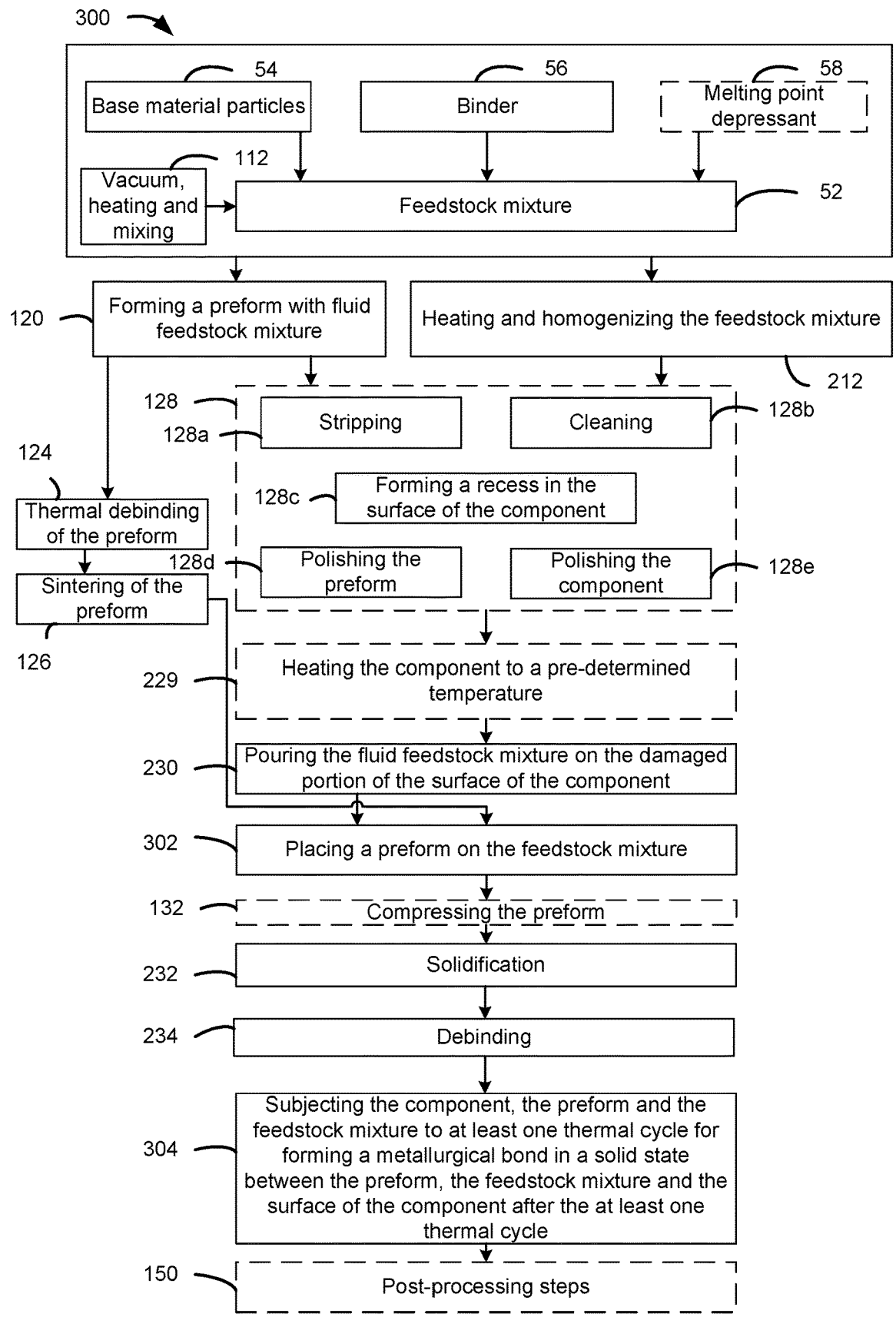
FIG. 6 is a flowchart of yet another repair method for a component having a damaged portion on a surface thereof.

Referring now to FIG. 6, the repair method 300 will be described. The repair method 300 involves steps similar to that of the repair methods 100, 200 and such steps will be referred to using the same reference numerals, unless stated otherwise. Generally described, the repair method 300 is a hybrid of the repair methods 100, 200 in that the repair method 300 involves forming a sintered preform 50 from fluid feedstock mixture 52 as described in steps 120, 126, pouring fluid feedstock mixture 52 on the damaged portion 44 of the surface 42 of the component 40 as described in step 230, then on to step 302 of placing the sintered preform 50 on the feedstock mixture 52 (as depicted in FIG. 2E), and step 304 of subjecting the component 40, the preform 50 and the feedstock mixture 52 to the thermal cycles similar to steps 126, 140, 240.

More particularly, the repair method 300 includes forming the preform 50 as described in step 120. The preform 50 is heated for debinding and sintering as described with reference to steps 124, 126 prior to being placed on the feedstock mixture 52 at step 302. The preform 50 can also be formed in a near net shape or a net shape, as described with reference to steps 122a, 122b, 122c (FIG. 4). The repair method 300 also includes the step 212 of heating and homogenizing the fluid feedstock mixture 52 that will be poured on the damaged portion 44, the step 229 of heating the component 40 to a pre-determined temperature. The repair method 300 can also include the surface preparation steps 128 described with reference to the repair method 100.

The repair method 300 includes the step 302 of placing the preform 50 on the feedstock mixture 52, as depicted in FIG. 2E. The repair method 300 can also include the compressing of the preform 50 as described with reference to step 132 to ensure good contact between the preform 50, the feedstock mixture 52 and the component 40. Once the feedstock mixture 52 has solidified at step 232, debinding occurs at step 234. At step 304, the component 40, the preform 50 and the debound feedstock mixture 52 are subjected to a thermal cycle similar to that described with reference to steps 140, 240, with the necessary adaptions due to the presence of both the feedstock mixture 52 and the preform 50. The repair method 300 may further include post-processing steps similar to that of step 150, such as machining and heat treating for precipitation hardening.

Turning now to FIGS. 7A-7H, an illustrative scenario involving steps from the repair methods 200, 300 and additional steps are presented. The component 40 is first heated to a pre-determined temperature as in step 229. At FIG. 7A, the fluid feedstock mixture 52 having a first ratio of MPD 58 is poured on the damaged portion 44 as in step 230. At FIG. 7B, the feedstock mixture 52 is let still to wet the damaged portion 44. At FIG. 7C, excess material from the feedstock mixture 52 is removed (for instance by scraping), and the component 40 is rapidly cooled down from the pre-determined temperature. At FIG. 7D, after the rapid cool down, the solidified feedstock mixture 52 shrinks and sticks on one side of the damaged portion 44, leaving a gap 53 between the solidified feedstock mixture 52 and some region(s) of the damaged portion 44. At FIG. 7E, fluid feedstock mixture 52' having a second ratio of MPD 58 different from the first ratio is then poured on the solidified feedstock mixture 52 and the damaged portion 44 of the still cooled down component 40. In one implementation, the first ratio of MPD 58 in the feedstock mixture 52 is greater than the second ratio of MPD 58 in the feedstock mixture 52'. The component 40 is re-heated to the pre-determined temperature, and the poured feedstock mixture 52' fills the gap 53 and the region(s) not covered by the solidified feedstock mixture 52. If needed, a debound and sintered preform 50 is placed on the poured feedstock mixture 52', as shown in FIG. 7G. Excess material from the feedstock mixture 52' is removed, as shown in FIG. 7H. The assembly of the component 40, the feedstock mixture 52, feedstock mixture 52' and the preform 50 (if present) is slowly cooled down, leading to a first region of the repaired area with solidified feedstock mixture 52, and a second region with solidified feedstock mixture 52'. The steps of debinding 234 and of subjecting 304 the assembly to at least one thermal cycle for forming a metallurgical bond in a solid state between the preform 50 (if present), the feedstock mixtures 52, 52' and the surface 42 of the component 40 are then performed. If needed, post-processing steps 150 are performed.

Turning now to FIG. 8A-8H, another illustrative scenario involving the steps from the repair methods 200, 300 and additional steps are shown. The component 40 is first heated to a pre-determined temperature as in step 229. In FIG. 8A, the fluid feedstock mixture 52 having a first ratio of MPD 58 is poured on the damaged portion 44 as in step 230. In FIG. 8B, the feedstock mixture 52 is let still to wet the damaged portion 44. In FIG. 8C, excess material from the fluid feedstock mixture 52 is removed (for instance by scraping) and the component 40 is cooled down for solidifying the feedstock mixture 52. The assembly of the component 40 and the solidified feedstock mixture 52 is then debound as in step 234 and subjected to thermal cycle(s) as in step 240. In FIG. 8D, after the thermal cycle(s) of step 240, the sintered feedstock mixture 52 has shrunk, leaving a gap 53 between the sintered feedstock mixture 52 and some region(s) of the damaged portion 44. The assembly of the component 40 and the sintered feedstock mixture 52 is heated to a pre-determined temperature. At FIG. 8E, fluid feedstock mixture 52' having a second ratio of MPD 58 different from the first ratio is then poured on the sintered feedstock mixture 52 and the damaged portion 44. In FIG. 8F, the poured feedstock mixture 52' fills the gap 53 and wets the region(s) not covered by the solidified feedstock mixture 52. If needed, a debound and sintered preform 50 is placed on the poured feedstock mixture 52', as shown in FIG. 8G. At FIG. 8H, excess material from the feedstock mixture 52' is removed and the assembly of the component 40, the feedstock mixture 52, feedstock mixture 52' and the preform 50 (if present) is slowly cooled down, leading to a first region of the repaired area with solidified feedstock mixture 52, and a second region with solidified feedstock mixture 52'. The steps of debinding 234 and of subjecting 304 the assembly to at least one thermal cycle for forming a metallurgical bond in a solid state between the preform 50 (if present), the feedstock mixtures 52, 52' and the surface 42 of the component 40 are then performed. If needed, post-processing steps 150 are performed. Thus, in this illustrative scenario, the assembly is debound and sintered at two different times.

The implementations described in this document provide non-limiting examples of possible implementations of the present technology. Upon review of the present disclosure, a person of ordinary skill in the art will recognize that changes may be made to the implementations described herein without departing from the scope of the present technology.

The invention claimed is:

1. A repair method for a component having a damaged portion on a surface thereof, the method comprising:
   obtaining a feedstock mixture comprising base material particles and a binder, the base material particles having a composition similar to one of a composition of the component and a composition of the surface of the component;
   heating and homogenizing the feedstock mixture to obtain a fluid feedstock mixture;
   pouring the fluid feedstock mixture on the damaged portion of the surface of the component;
   solidifying the fluid feedstock mixture to obtain a solidified feedstock mixture on the damaged portion of the surface of the component; and
   subjecting the component and the solidified feedstock mixture to at least one thermal cycle for forming a metallurgical bond in a solid state between the solidified feedstock mixture and the surface of the component after the at least one thermal cycle, the at least one thermal cycle occurring below a melting temperature of the component and the solidified feedstock mixture.

2. The method of claim 1, further comprising heating the component to a pre-determined temperature prior to the pouring of the fluid feedstock mixture on the damaged portion of the surface of the component.

3. The method of claim 1, further comprising debinding the solidified feedstock mixture prior to the subjecting to the at least one thermal cycle.

4. The method of claim 1, further comprising:
   forming a preform by injecting the feedstock mixture into a mold;
   debinding and sintering the preform;
   placing the debound and sintered preform on the poured feedstock mixture prior to the solidification of the fluid feedstock mixture; and
   subjecting the component, the preform and the solidified feedstock mixture to the at least one thermal cycle.

5. The method of claim 1, wherein the feedstock mixture is a first feedstock mixture consisting of the base material particles, the binder and of a first ratio of melting point depressant material, and the method further comprises:
   obtaining a second fluid feedstock mixture consisting of the base material particles, the binder and of a second ratio of melting point depressant material, the second ratio different from the first ratio;
   pouring the second fluid feedstock mixture on the damaged portion of the surface of the component including the first solidified feedstock mixture thereby filling a gap vcreated by shrinkage of the first solidified feedstock mixture;
   solidifying the second feedstock mixture to obtain a second solidified feedstock mixture on the damaged portion of the surface of the component; and
   subjecting the component and the first and second solidified feedstock mixtures to at least one additional thermal cycle for forming a metallurgical bond in a solid state between the second solidified feedstock mixture and the surface of the component after the at least one additional thermal cycle.

* * * * *